(12) United States Patent
Mizuno et al.

(10) Patent No.: US 8,306,344 B2
(45) Date of Patent: Nov. 6, 2012

(54) IMAGE PROCESSOR WITH AN ENCODER IN A PREDICTIVE CODING SYSTEM THAT REDUCES AN AMOUNT OF ENCODED DATA

(75) Inventors: Yusuke Mizuno, Osaka (JP); Takashi Mori, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 909 days.

(21) Appl. No.: 12/402,776

(22) Filed: Mar. 12, 2009

(65) Prior Publication Data
US 2009/0245669 A1    Oct. 1, 2009

(30) Foreign Application Priority Data
Mar. 27, 2008  (JP) .................. 2008-084157

(51) Int. Cl.
G06K 9/00  (2006.01)
G06K 9/36  (2006.01)
G06K 9/46  (2006.01)
(52) U.S. Cl. ...................... 382/239; 382/166
(58) Field of Classification Search .......... 382/166, 382/233, 248, 250, 232, 239
See application file for complete search history.

(56) References Cited

U.S. PATENT DOCUMENTS 5,905,815 A * 5/1999 Mack et al. ............ 382/250
6,768,818 B2 * 7/2004 Friederich et al. ...... 382/233
7,146,051 B2 * 12/2006 Kang et al. ............ 382/232
7,440,624 B2 * 10/2008 Kodama et al. ........ 382/232
7,466,867 B2 * 12/2008 Sung et al. ............ 382/246

FOREIGN PATENT DOCUMENTS
JP    6-112836    4/1994
JP    8-167851    6/1996

OTHER PUBLICATIONS

De Simone et al. ("A comparative study of JPEG 2000, AVC/H-264 and HD Photo," SPIE Optics and Photonics, Applications of Digital Image Processing, Aug. 2007).*
Srinivasan et al. ("HD Photo: A new image coding technology for digital photography," Proc. SPIE 6696, Aug. 2007).*
"HD Photo—Photographic Still Image File Format", Nov. 7, 2006, pp. 140.
"Coding of Still Pictures—JBIG JPEG", ISO/IEC JTC 1/SC 29/WG 1 N 4392, ISO/IEC CD 29199-2, Dec. 19, 2007, pp. 151.

* cited by examiner

*Primary Examiner* — Yubin Hung
(74) *Attorney, Agent, or Firm* — Oblon, Spivak, McClelland, Maier & Neustadt, L.L.P.

(57) ABSTRACT

An image processor includes an encoding unit encoding inputted data. The encoding unit includes a first processing unit splitting the data into a first partial data in a first digit range on an upper side and a second partial data in a second digit range on a lower side, a second processing unit encoding only the first partial data between the first partial data and the second partial data, and a third processing unit performing correction to set a value of the first partial data at "0".

16 Claims, 6 Drawing Sheets

# IMAGE PROCESSOR WITH AN ENCODER IN A PREDICTIVE CODING SYSTEM THAT REDUCES AN AMOUNT OF ENCODED DATA

CROSS-REFERENCE TO RELATED APPLICATIONS

This application claims priority to Japanese Patent Application No. 2008-084157. The entire disclosure of Japanese Patent Application No. 2008-084157 is hereby incorporated herein by reference.

BACKGROUND OF THE INVENTION

1. Field of the Invention

The present invention relates to an image processor, and more particularly, to an encoder in a predictive coding system.

2. Description of the Background Art

FIG. 8 is a block diagram showing a configuration of an encoder 101 in a predictive coding system. The encoder 101 includes a quantization unit 102, a prediction unit 103, and an encoding unit 104. Data D100 is inputted from a preceding processing block (not shown) to the quantization unit 102. The quantization unit 102 quantizes the data D100, so as to output data D101. The data D101 is inputted from the quantization unit 102 to the prediction unit 103. Meanwhile, data which was previously processed has been inputted to the prediction unit 103 as prediction data D102. The prediction unit 103 outputs a difference value between the data D101 and the prediction data D102 as data D103. The data D103 is inputted from the prediction unit 103 to the encoding unit 104. The encoding unit 104 performs entropy coding on the data D103, so as to output coded data D104.

Microsoft Corporation has recently proposed HD Photo (or JPEG XR) as a still image file format that offers higher image quality than JPEG while requiring more simple circuit configuration and computation than JPEG 2000.

FIG. 9 is a block diagram showing a configuration of an encoder 201 for HD Photo. The encoder 201 includes a color conversion unit 202, a pre-filter 203, a frequency transform unit 204, a quantization unit 205, a prediction unit 206, and an encoding unit 207.

A pixel signal D200 of RGB color space is inputted from an imaging element, such as a CCD or CMOS image sensor, to the color conversion unit 202. The color conversion unit 202 converts the pixel signal D200 into a pixel signal D201 of, for example, YUV color space, and outputs the same. The pixel signal D201 is inputted from the color conversion unit 202 to the pre-filter 203. The pre-filter 203 performs prefiltering to reduce block artifacts on the pixel signal D201, and outputs a pixel signal D202. The pixel signal D202 is inputted from the pre-filter 203 to the frequency transform unit 204. The frequency transform unit 204 performs predetermined frequency transform (PCT: HD Photo Core Transform) on the pixel signal D202, and outputs data D203 after frequency transform. In HD Photo, the data D203 includes highpass, lowpass, and direct current components.

The data D203 is inputted from the frequency transform unit 204 to the quantization unit 205. The quantization unit 205 quantizes the data D203, so as to output data D204. The data D204 is inputted from the quantization unit 205 to the prediction unit 206. Meanwhile, data which was previously processed has been inputted to the prediction unit 206 as prediction data. The prediction unit 206 outputs a difference value between the data D204 and the prediction data as data D205. The data D205 is inputted from the prediction unit 206 to the encoding unit 207. The encoding unit 207 performs entropy coding on the data D205, so as to output coded data D206.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures -JBIG JPEG", [online], 19 Dec. 2007, ISO/IEC JTC 1/SC 29/WG1 N 4392, [searched in the Internet on 4 Mar. 2008], <URL: http://www.itscj.ipsj.orjp/sc29/open/29view/29n9026t.doc>.

In the encoders 101 and 201 shown in FIGS. 8 and 9, the values of data after prediction (data D103 and D205) inputted to the encoding units 104 and 207 are preferably as small as possible, in order that an amount of code of the coded data D104 and D206 outputted from the encoding units 104 and 207 is reduced.

SUMMARY OF THE INVENTION

It is an object of the present invention to provide an image processor that reduces an amount of code of coded data, by making a value of data after prediction inputted to an encoding unit small.

According to an aspect of the present invention, an image processor includes an encoding unit encoding inputted data. The encoding unit includes a first processing unit splitting the data into a first partial data in a first digit range on an upper side and a second partial data in a second digit range on a lower side, a second processing unit encoding only the first partial data between the first partial data and the second partial data, and a third processing unit performing correction to set a value of the first partial data at "0".

The value of the first partial data is set at "0" by correction performed by the third processing unit. Consequently, since the value of the first partial data to be encoded by the second processing unit becomes smaller, reduction of an amount of code of the data after encoding is achieved. Furthermore, only the first partial data on the upper side is encoded, rather than the whole data inputted to the encoding unit, and effect of reduction of an amount of code is achieved by encoding this first partial data on the upper side. Thus effect of reduction of an amount of code is more prominent than when the whole data inputted to the encoding unit is encoded.

Preferably in the image processor, the first partial data includes a third partial data in a digit range on an upper side and a fourth partial data in a digit range on a lower side, and the third processing unit performs the correction on the fourth partial data upon condition that a value of the third partial data is "0".

The third processing unit performs the correction on the fourth partial data on the lower side upon condition that the value of the third partial data on the upper side is "0". In other words, the third processing unit does not perform the correction on the fourth partial data, when the value of the third partial data is not "0". This avoids extreme degradation of the image quality by the correction on the first partial data having a relatively large value.

Preferably in the image processor, the encoding unit further includes a fourth processing unit setting values of all digits in the second digit range at "1", when the third processing unit performs the correction.

The fourth processing unit sets the values of all digits in the second digit range at "1", when the third processing unit performs the correction. Setting the second partial data on the lower side at the maximum value avoids extreme degradation of the image quality, when the value of the first partial data on the upper side is corrected to be "0".

Preferably in the image processor, the third processing unit performs the correction only on data of highpass component, among data of highpass, lowpass, and direct current components in HD Photo.

The third processing unit performs the correction only on data of highpass component, among data of highpass, lowpass, and direct current components in HD Photo. In other words, the third processing unit does not perform the correction on data of each of lowpass and direct current components. In HD Photo, prediction data of highpass component is obtained within a currently target macroblock. In contrast, prediction data of lowpass and direct current components are obtained based on a previously processed macroblock. Thus if the correction is performed on data of each of lowpass and direct current components, an error caused by the correction may propagate, resulting in sever degradation of the image quality. The third processing unit does not perform the correction on the data of each of lowpass and direct current components. Thus sever degradation of the image quality is avoided.

Preferably in the image processor, the first digit range is a Normal Bit in HD Photo, and the second digit range is a Flex Bit in HD Photo.

With respect to a Normal Bit on which entropy coding is performed in HD Photo, reduction of an amount of code of the data after entropy coding is achieved.

Reduction of an amount of code of coded data is achieved.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
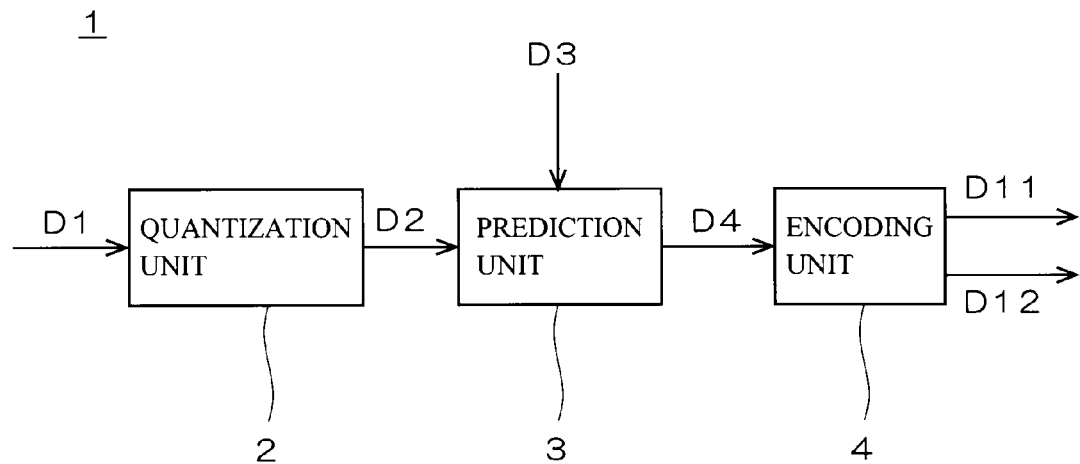
FIG. 1 is a block diagram showing a configuration of an image processor according to a preferred embodiment of the present invention.

Preferred embodiments of the present invention are described in detail below referring to the drawings. It should be noted that identical reference numerals throughout the drawings indicate identical or equivalent elements.

FIG. 1 is a block diagram showing a configuration of an image processor 1 according to a preferred embodiment of the present invention. The image processor 1 is applicable to an encoder whose target data of encoding includes a part to be encoded and a part not to be encoded, such as an encoder in HD Photo, for example.

The image processor 1 includes a quantization unit 2, a prediction unit 3, and an encoding unit 4. Data D1 before quantization is inputted from a preceding processing block (not shown. a frequency transform unit, for example) to the quantization unit 2. The quantization unit 2 quantizes the data D1, so as to output data D2. The data D2 is inputted from the quantization unit 2 to the prediction unit 3. Meanwhile, data which was previously processed (data in the former process, for example) has been inputted to the prediction unit 3 as prediction data D3. The prediction unit 3 outputs a difference value between the data D2 and the prediction data D3 as data D4. Depending on a condition, the prediction unit 3 does not perform prediction. In such a case, data having a value "0" is employed as the prediction data D3. The data D4 is inputted from the prediction unit 3 to the encoding unit 4. Coded data D11 and data D12 that is not encoded are outputted from the encoding unit 4.

Figure 2:
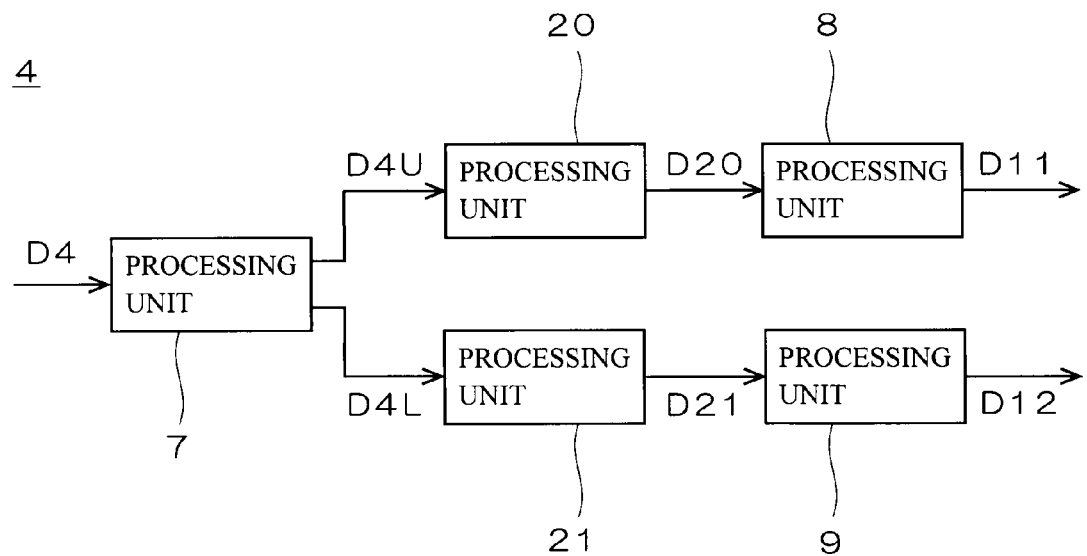
FIG. 2 is a block diagram showing a configuration of an encoding unit shown in FIG. 1.

FIG. 2 is a block diagram showing a configuration of the encoding unit 4 shown in FIG. 1. The encoding unit 4 includes processing units 7 to 9, 20, and 21. The data D4 is inputted from the prediction unit 3 shown in FIG. 1 to the processing unit 7.

Figure 3:
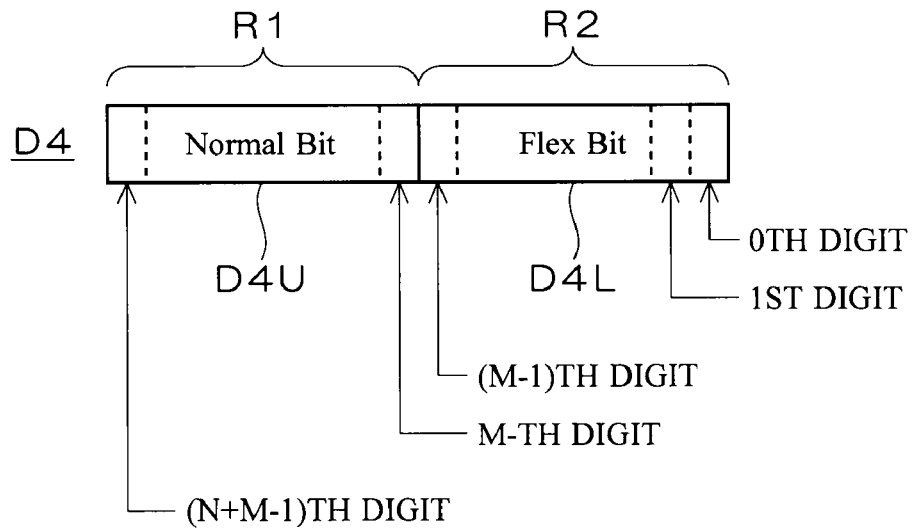
FIG. 3 shows data.

FIG. 3 shows the data D4. The processing unit 7 splits the data D4 into partial data D4U in a digit range R1 on the upper (i.e. more significant) side and partial data D4L in a digit range R2 on the lower (i.e. less significant) side. The digit ranges R1 and R2 are respectively equivalent to Normal Bits and Flex Bits in HD Photo. Let the bit width of the digit range R1 be N, the bit width of the digit range R2 (Model Bits) be M, and the least significant digit of the digit range R2 be the 0th digit. Then the most significant digit of the digit range R2 is the (M−1)th digit, the least significant digit of the digit range R1 is the M-th digit, and the most significant digit of the digit range R1 is the (N+M−1)th digit. In HD Photo, the bit width M is adaptively variable.

Referring to FIG. 2, the partial data D4U is inputted from the processing unit 7 to the processing unit 20. Partial data D20 is outputted from the processing unit 20. The partial data D20 is inputted from the processing unit 20 to the processing unit 8. The processing unit 8 performs entropy coding on the partial data D20, so as to output the coded data D11. The partial data D4L is inputted from the processing unit 7 to the processing unit 21. Partial data D21 is outputted from the processing unit 21. The partial data D21 is inputted from the processing unit 21 to the processing unit 9. The processing unit 9 generates data D12 to be outputted based on the data D21.

Figure 4:
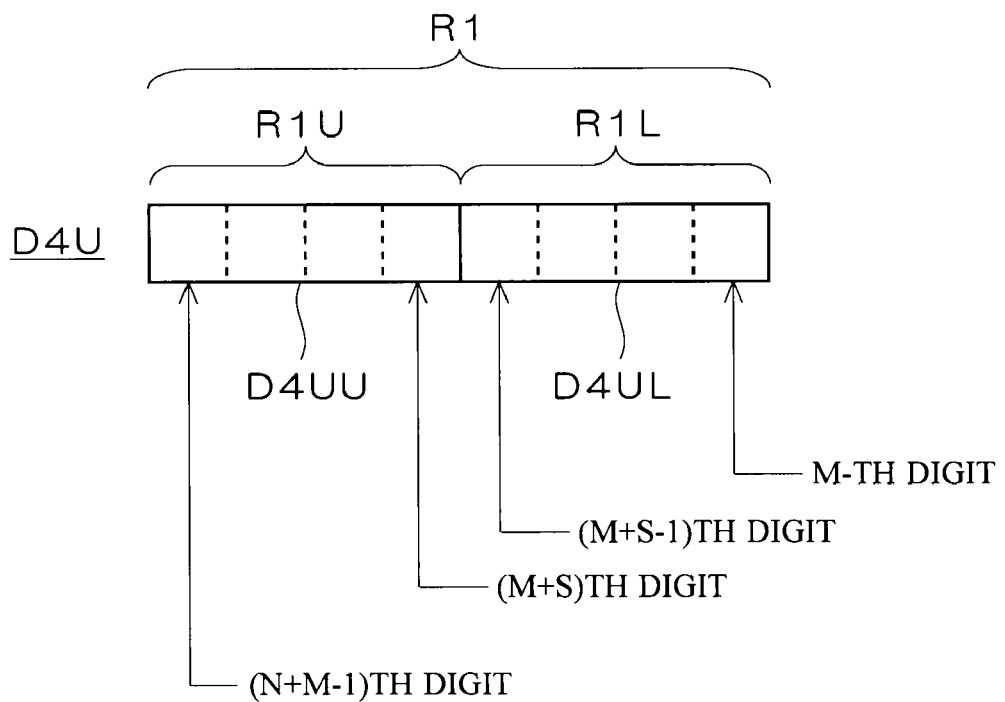
FIG. 4 shows partial data.

FIG. 4 shows the partial data D4U. The partial data D4U includes partial data D4UU in a digit range R1U on the upper side and partial data D4UL in a digit range R1L on the lower side. Let the bit width of the digit range R1L be S. Then the most significant digit of the digit range R1L is the (M+S−1)th digit, and the least significant digit of the digit range R1U is the (M+S)th digit. One can set the bit width S arbitrarily.

FIGS. 5A to 5D illustrate a first example of processing of the processing units 8, 9, 20 and 21 shown in FIG. 2. In FIGS. 5A to 5D, it is assumed that the bit widths of the partial data D4U and D4L are both 8 bits and the bit width S of the partial data D4UL (digit range R1L) is 4 bits, by way of example.

Figure 5A:
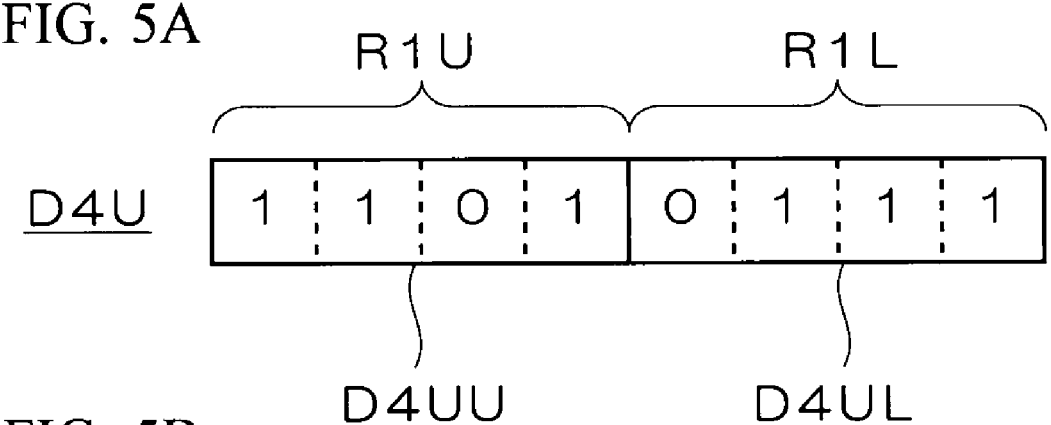
FIGS. 5A to 5D illustrate a first example of processing of processing units shown in FIG. 2.
Figure 5B:
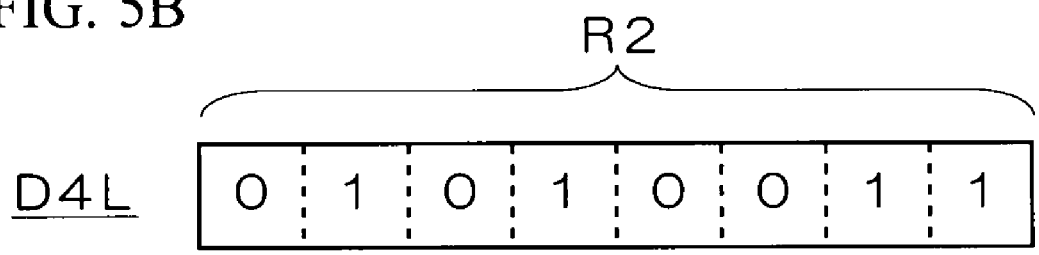

As shown in FIG. 5A, the partial data D4U having a value, for example, "11010111" is inputted to the processing unit 20. Then the values of the partial data D4UU and D4UL are respectively "1101" and "0111". As shown in FIG. 5B, the partial data D4L having a value, for example, "01010011" is inputted to the processing unit 21.

Figure 5C:
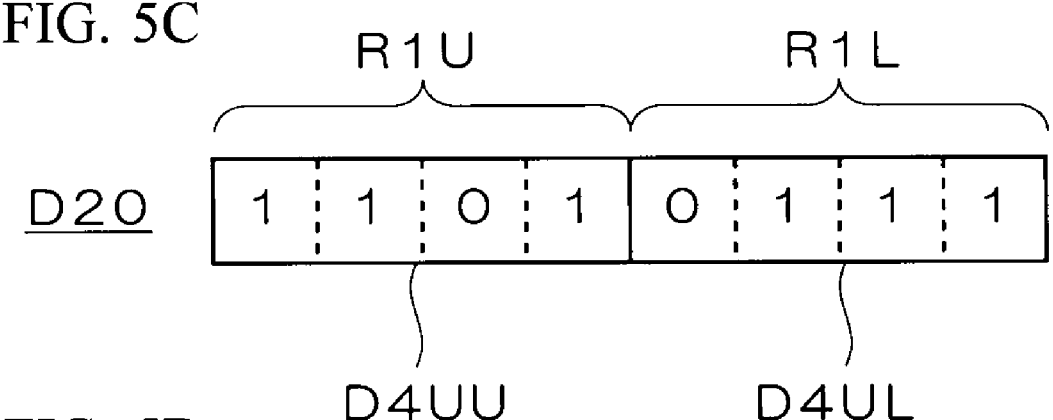
Figure 5D:
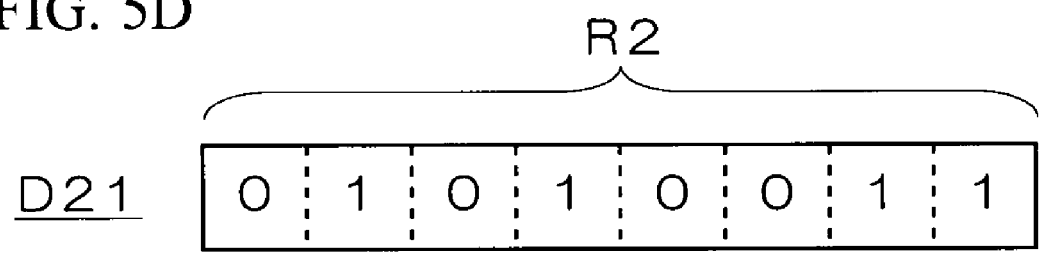

The processing unit 20 checks the value of each digit of the partial data D4UU. In this first example, a digit having a value "1" is included in the plural digits of the partial data D4UU. That is, the value of the whole partial data D4UU is not "0". In such a case, the processing units 20 and 21 respectively outputs the partial data D4U and D4L as the partial data D20 and D21 without changing, as shown in FIGS. 5C and 5D.

FIGS. 6A to 6D illustrate a second example of processing of the processing units 8, 9, 20 and 21 shown in FIG. 2. Similar to FIGS. 5A to 5D, it is assumed in FIGS. 6A to 6D that the bit widths of the partial data D4U and D4L are both 8 bits and the bit width S of the partial data D4UL (digit range R1L) is 4 bits, by way of example.

Figure 6A:
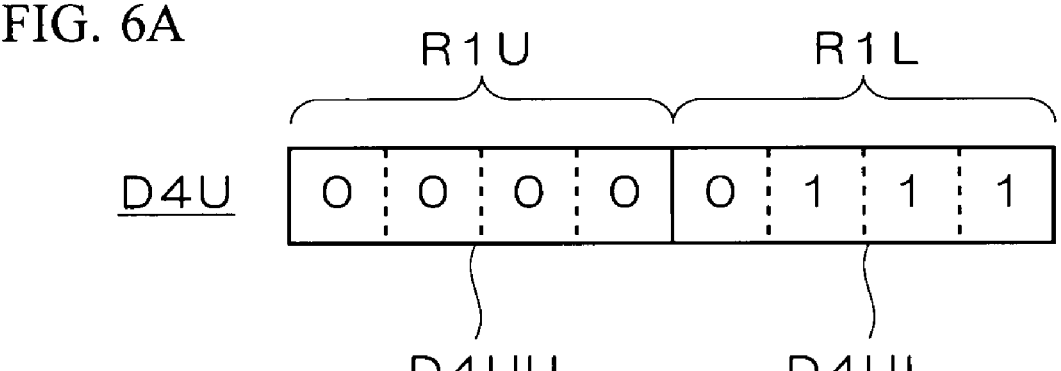
FIGS. 6A to 6D illustrate a second example of processing of processing units shown in FIG. 2.
Figure 6B:
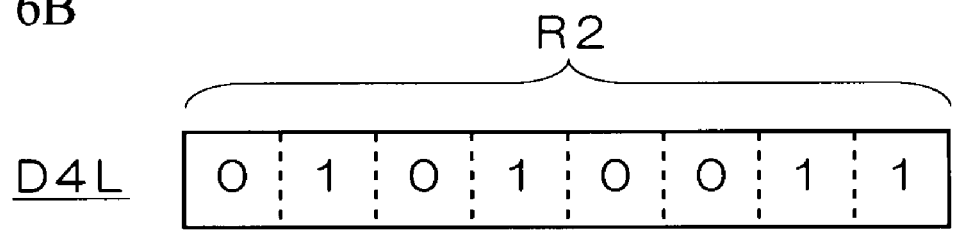

As shown in FIG. 6A, the partial data D4U having a value, for example, "00000111" is inputted to the processing unit 20. Then the values of the partial data D4UU and D4UL are respectively "0000" and "0111". As shown in FIG. 6B, the partial data D4L having a value, for example, "01010011" is inputted to the processing unit 21.

Figure 6C:
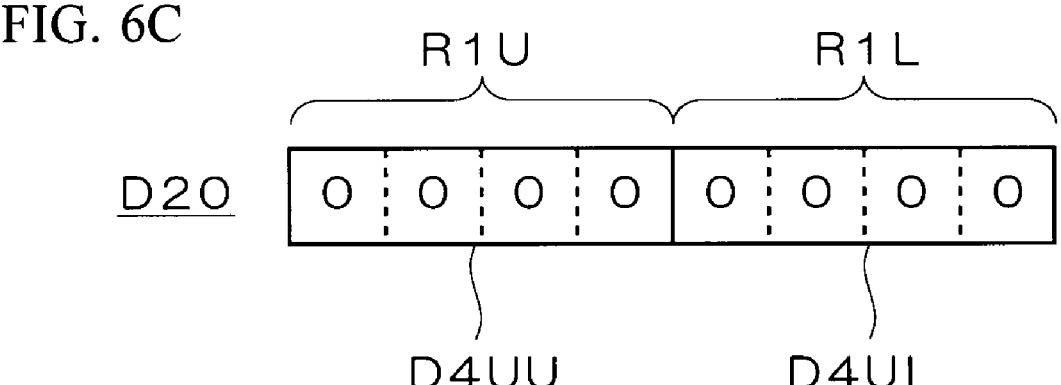
Figure 6D:
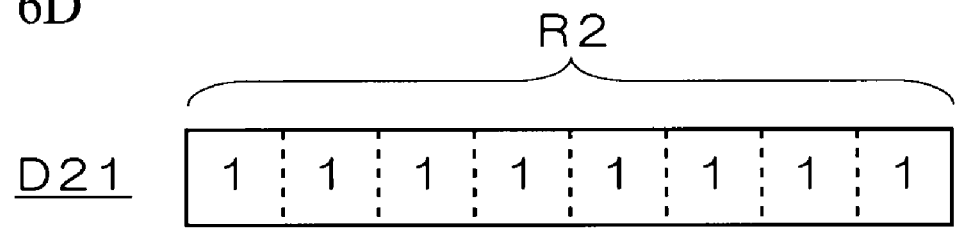

The processing unit 20 checks the value of each digit of the partial data D4UU. In this second example, no digit having a value "1" is included in the plural digits of the partial data D4UU. That is, the value of the whole partial data D4UU is "0". In such a case, the processing unit 20 performs correction to set the values of all digits of the partial data D4UL at "0" and outputs the partial data D20 having a value "0" as a whole, as shown in FIG. 6C. Also in such a case, the processing unit 21 sets the values of all digits of the partial data D4L at "1" and outputs as the partial data D21, as shown in FIG. 6D.

As described above, according to the image processor 1 of the present embodiment, the processing unit 20 performs correction to set the value of the partial data D4U at "0", and outputs as the partial data D20, as shown in FIGS. 6A to 6D. Consequently, the value of the partial data D20 to be encoded by the processing unit 8 becomes smaller, and thus reduction of an amount of code of the coded data D11 is achieved. Furthermore, only the partial data D4U (the partial data D20) on the upper side is encoded, rather than the whole data D4 inputted to the encoding unit 4, and effect of reduction of an amount of code is achieved by encoding this partial data D4U (the partial data D20) on the upper side. Thus effect of reduction of an amount of code is more prominent than when the whole data D4 inputted to the encoding unit 4 is encoded.

Moreover, according to the image processor 1 of the present embodiment, the processing unit 20 performs correction on the partial data D4UL on the lower side, upon condition that the value of the partial data D4UU on the upper side is "0". In other words, when the value of the partial data D4UU is not "0", the processing unit 20 does not perform correction on the partial data D4UL, as shown in FIGS. 5A to 5D. This avoids extreme degradation of the image quality by correction on the partial data D4U having a relatively large value.

Furthermore, according to the image processor 1 of the present embodiment, the processing unit 21 sets the values of all digits of the digit range R2 at "1", when the processing unit 20 performs correction as shown in FIGS. 6A to 6D. Setting the partial data D4L on the lower side at the maximum value avoids extreme degradation of the image quality, when the value of the partial data D4U on the upper side is corrected to be "0".

Figure 7:
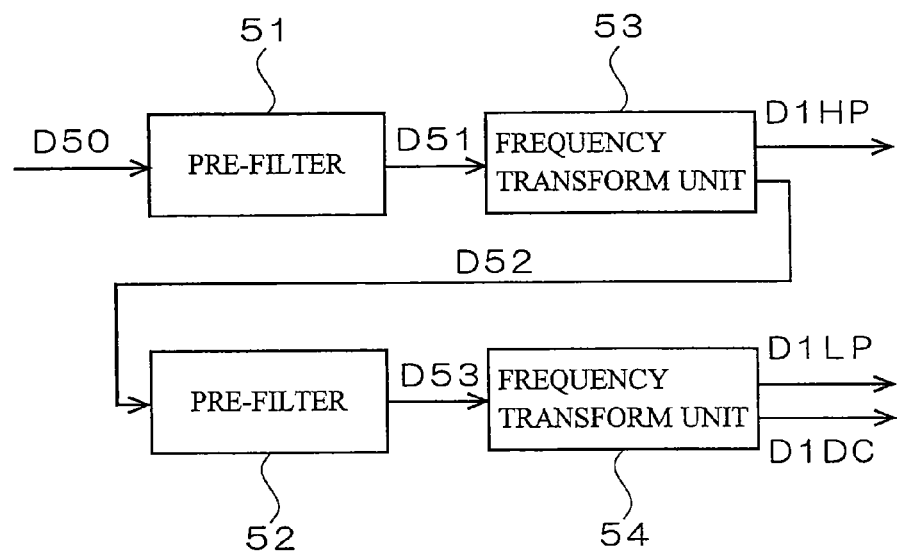
FIG. 7 is a block diagram showing a configuration of prefilters and frequency transform units in an encoder for HD Photo.
Figure 8:
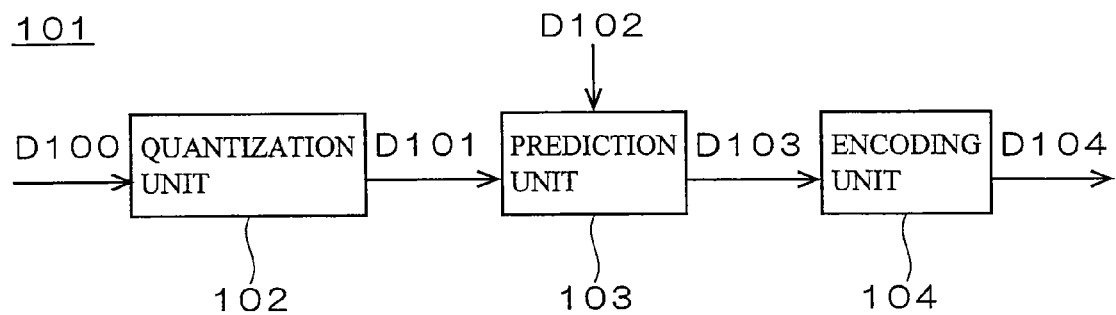
FIG. 8 is a block diagram showing a configuration of an encoder in a predictive coding system.
Figure 9:
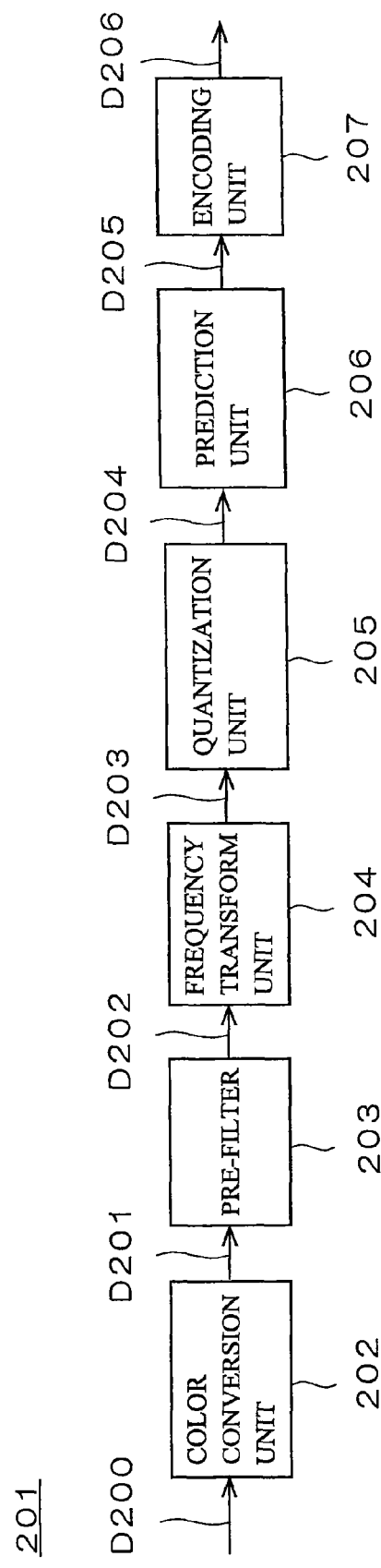
FIG. 9 is a block diagram showing a configuration of an encoder for HD Photo.

FIG. 7 is a block diagram showing a configuration of pre-filters 51 and 52 and frequency transform units 53 and 54 in an encoder for HD Photo. As shown in FIG. 7, the encoder for HD Photo includes the pre-filter 51 and the frequency transform unit 53 of a first stage, and the pre-filter 52 and the frequency transform unit 54 of a second stage.

A pixel signal D50 is inputted to the pre-filter 51. The pre-filter 51 performs prefiltering on the pixel signal D50 and outputs a pixel signal D51 after prefiltering. The pixel signal D51 is inputted to the frequency transform unit 53. The frequency transform unit 53 performs frequency transform (PCT) on the pixel signal D51, and outputs data D1HP of highpass component and data D52 of direct current component in the first stage. The data D52 is inputted to the pre-filter 52. The pre-filter 52 performs prefiltering on the data D52 and outputs data D53 after prefiltering. The data D53 is inputted to the frequency transform unit 54. The frequency transform unit 54 performs frequency transform (PCT) on the data D53, and outputs data D1LP of lowpass component and data D1DC of direct current component.

The data D1HP, D1LP, and D1DC outputted from the frequency transform units 53 and 54 are inputted to the quantization unit 2 as the data D1 shown in FIG. 1. Similarly, the data D4 inputted to the encoding unit 4 includes data of highpass, lowpass, and direct current components.

In the image processor 1 of the present embodiment, the processing unit 20 shown in FIG. 2 performs above correction only on data of highpass component, among data of highpass, lowpass, and direct current components. In other words, the processing unit 20 does not perform correction on data of each of lowpass and direct current components. In HD Photo, prediction data of highpass component is obtained within a currently target macroblock. In contrast, prediction data of lowpass and direct current components are obtained based on a previously processed macroblock. Thus if correction is performed on data of each of lowpass and direct current components, an error caused by correction may propagate, resulting in sever degradation of the image quality. On the other hand, in the image processor 1 of the present embodiment, the processing unit 20 does not perform correction on the data of each of lowpass and direct current components. Thus sever degradation of the image quality is avoided.

While the invention has been described in detail, the foregoing description is in all aspects illustrative and not restrictive. It is understood that numerous other modifications and variations can be devised without departing from the scope of the invention.

What is claimed is:

1. An image processor comprising:
an encoding unit encoding inputted data,
the encoding unit including:
a first processing unit splitting the data into a first partial data in a first digit range on an upper side and a second partial data in a second digit range on a lower side;
a second processing unit encoding only the first partial data of the first partial data and the second partial data; and
a third processing unit performing correction to set a value of the first partial data at "0".

2. The image processor according to claim 1, wherein
the first partial data includes a third partial data in a digit range on an upper side and a fourth partial data in a digit range on a lower side, and
the third processing unit performs the correction on the fourth partial data upon condition that a value of the third partial data is "0".

3. The image processor according to claim 2,
the encoding unit further including:
a fourth processing unit setting values of all digits in the second digit range at "1", when the third processing unit performs the correction.

4. The image processor according to claim 3, wherein the third processing unit performs the correction only on data of highpass component, among data of highpass, lowpass, and direct current components in HD Photo.

5. The image processor according to claim 4, wherein the first digit range is a Normal Bit in HD Photo, and the second digit range is a Flex Bit in HD Photo.

6. The image processor according to claim 3, wherein the first digit range is a Normal Bit in HD Photo, and the second digit range is a Flex Bit in HD Photo.

7. The image processor according to claim 2, wherein the third processing unit performs the correction only on data of highpass component, among data of highpass, lowpass, and direct current components in HD Photo.

8. The image processor according to claim 7, wherein the first digit range is a Normal Bit in HD Photo, and the second digit range is a Flex Bit in HD Photo.

9. The image processor according to claim 2, wherein the first digit range is a Normal Bit in HD Photo, and the second digit range is a Flex Bit in HD Photo.

10. The image processor according to claim 1, the encoding unit further including:

a fourth processing unit setting values of all digits in the second digit range at "1", when the third processing unit performs the correction.

11. The image processor according to claim 10, wherein the third processing unit performs the correction only on data of highpass component, among data of highpass, lowpass, and direct current components in HD Photo.

12. The image processor according to claim 11, wherein the first digit range is a Normal Bit in HD Photo, and the second digit range is a Flex Bit in HD Photo.

13. The image processor according to claim 10, wherein the first digit range is a Normal Bit in HD Photo, and the second digit range is a Flex Bit in HD Photo.

14. The image processor according to claim 1, wherein the third processing unit performs the correction only on data of highpass component, among data of highpass, lowpass, and direct current components in HD Photo.

15. The image processor according to claim 14, wherein the first digit range is a Normal Bit in HD Photo, and the second digit range is a Flex Bit in HD Photo.

16. The image processor according to claim 1, wherein the first digit range is a Normal Bit in HD Photo, and the second digit range is a Flex Bit in HD Photo.

* * * * *